US012791882B2

(12) United States Patent
Kang et al.

(10) Patent No.: US 12,791,882 B2
(45) Date of Patent: Nov. 10, 2026

(54) DISPLAY DEVICE

(71) Applicant: Electronics and Telecommunications Research Institute, Daejeon (KR)

(72) Inventors: Chan-mo Kang, Daejeon (KR); Sukyung Choi, Daejeon (KR); Byoung-Hwa Kwon, Daejeon (KR); Joo Yeon Kim, Daejeon (KR); Kang Me Lee, Daejeon (KR); Chunwon Byun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 42 days.

(21) Appl. No.: 18/956,713

(22) Filed: Nov. 22, 2024

(65) Prior Publication Data

US 2025/0172825 A1 May 29, 2025

(30) Foreign Application Priority Data

Nov. 29, 2023 (KR) ........................ 10-2023-0169971
Oct. 31, 2024 (KR) ........................ 10-2024-0152050

(51) Int. Cl.
*G02F 1/01* (2006.01)
*G02B 30/22* (2020.01)

(52) U.S. Cl.
CPC ........... *G02F 1/0105* (2013.01); *G02B 30/22* (2020.01)

(58) Field of Classification Search
CPC .............................. G02F 1/0105; G02B 30/22
See application file for complete search history.

(56) References Cited

U.S. PATENT DOCUMENTS

| | | | | |
|---|---|---|---|---|
| 7,660,025 | B2 * | 2/2010 | Kim | G02B 26/0833 359/223.1 |
| 9,377,629 | B2 | 6/2016 | Lee et al. | |
| 10,318,091 | B2 | 6/2019 | Lee et al. | |
| 10,756,140 | B2 | 8/2020 | Yang et al. | |
| 2005/0133101 | A1 | 6/2005 | Chung et al. | |
| 2010/0308281 | A1 | 12/2010 | Zheng | |
| 2014/0016175 | A1 | 1/2014 | Kim et al. | |
| 2019/0025571 | A1 * | 1/2019 | Lee | G02B 26/08 |
| 2022/0199706 | A1 * | 6/2022 | Kang | H10K 59/35 |

(Continued)

FOREIGN PATENT DOCUMENTS

| | | | | |
|---|---|---|---|---|
| CN | 103348308 B | * 8/2016 | | B60K 35/25 |
| CN | 105932171 A | * 9/2016 | | H10K 50/00 |
| CN | 110537154 A | * 12/2019 | | G02B 26/0858 |

(Continued)

OTHER PUBLICATIONS

KR-20070047045-A; May 4, 2007; Lee Sang Pil (English Translation).*

(Continued)

*Primary Examiner* — Ricardo Osorio
(74) *Attorney, Agent, or Firm* — NSIP Law

(57) ABSTRACT

Provided is a display device, wherein the display device includes a backplane, a control unit on the backplane, a light source between the backplane and the control unit, a transparent electrode connected to the control unit, and a shape control layer on the transparent electrode. The control unit is configured to control a voltage of the transparent electrode. The shape control layer includes an electro-active polymer (EAP).

20 Claims, 24 Drawing Sheets

(56) References Cited

U.S. PATENT DOCUMENTS

| | | | |
|---|---|---|---|
| 2023/0261136 A1 | 8/2023 | Lee et al. | |

FOREIGN PATENT DOCUMENTS

| | | | | | |
|---|---|---|---|---|---|
| JP | 2020-517040 | A | | 6/2020 | |
| KR | 20070047045 | A | * | 5/2007 | ........... H10K 50/858 |
| KR | 10-2008-0103231 | A | | 11/2008 | |
| KR | 10-2012-0111456 | A | | 10/2012 | |
| KR | 10-2013-0114559 | A | | 10/2013 | |
| KR | 10-2014-0010717 | A | | 1/2014 | |
| KR | 10-2015-0069410 | A | | 6/2015 | |
| KR | 10-1893538 | B1 | | 10/2018 | |
| KR | 10-2023-0123533 | A | | 8/2023 | |
| KR | 10-2659772 | B1 | | 4/2024 | |

OTHER PUBLICATIONS

CN-105932171-A;Sep. 7, 2016; Jia, Wen-bin. (English Translation).*

CN-103348308-B; Aug. 10, 2016; Aug. 10, 2016. (English Translation).*

CN-110537154-A; Dec. 3, 2019; Hamburgen, William Riis. (English Translation).*

* cited by examiner

DISPLAY DEVICE

CROSS-REFERENCE TO RELATED APPLICATIONS

This U.S. non-provisional patent application claims priority under 35 U.S.C. § 119 of Korean Patent Application No. 10-2023-0169971, filed on Nov. 29, 2023, and No. 10-2024-0152050 filed on Oct. 31, 2024, the entire contents of which are hereby incorporated by reference.

BACKGROUND

The present disclosure herein relates to a display device including an electro-active polymer (EAP).

With the development of the information society, the demand for displays for display information is increasing. Accordingly, various displays such as a liquid crystal display (LCD), electronic paper (e-paper), an organic light-emitting display (OLED), and a microdisplay have been developed and utilized.

Recently, various types of displays for expressing stereoscopic images have been developed, and various methods for expressing stereoscopic images have been proposed. Representative examples include a multiplane display which forms multiple focal planes and play the focal planes sequentially, a varifocal display which changes a focal plane and express the focal plane sequentially, a lightfield display which calculates a distribution of light, and a holographic display which considers the distribution and phase of light.

SUMMARY

The present disclosure provides a display device for implementing stereoscopic images.

A display device according to some embodiments of the present invention may include a backplane, a control unit on the backplane, a light source between the backplane and the control unit, a transparent electrode connected to the control unit, and a shape control layer on the transparent electrode. The control unit may control a voltage of the transparent electrode. The shape control layer may include an electro-active polymer (EAP).

According to some embodiments, the electro-active polymer may include one or more selected from the group consisting of a conductive polymer, an ionic polymer, Nafion, and Flemion.

According to some embodiments, the conductive polymer may include one or more selected from the group consisting of polypyrrole, polyaniline, polythiophene, and poly-sodium allyloxy hydroxypropyl sulfonate.

According to some embodiments, the ionic polymer may include one or more selected from the group consisting of a carbon nanotube, a fluorinated polymer, and a sulfonated polymer.

According to some embodiments, the sulfonated polymer may include one or more selected from the group consisting sulfonated polystyrene, sulfonated poly (vinyl alcohol), sulfonated poly(arylene ether sulfone), sulfonated ethylene vinyl alcohol copolymer, and sulfonated poly(styrene-b-ethylene-co-butylene-b-styrene).

According to some embodiments, the absolute value of the half beam angle of the light source may be 5° or less.

According to some embodiments, the display device may further include a first electrode on the substrate, and a second electrode on the light source. The first electrode and the second electrode may be spaced apart from each other with the light source interposed therebetween.

According to some embodiments, the first electrode may include a transparent conductive material and an electrode material, wherein the transparent conductive material may include one or more selected from the group consisting of a transition metal oxide, a metal nitride, indium tin oxide, and aluminum-doped zinc oxide, and the electrode material may include one or more selected from the group consisting of silver (Ag), aluminum (Al), molybdenum (Mo), cobalt (Co), copper (Cu), gold (Au), platinum (Pt), tungsten (W), chromium (Cr), magnesium (Mg), and lithium (Li).

A display device according to some embodiments of the present invention may include a backplane, and a plurality of pixels on the backplane. The pixels may each include a control unit on the backplane, a light source between the backplane and the control unit, a transparent electrode connected to the control unit, and a shape control layer on the transparent electrode. The control unit may control a voltage of the transparent electrode. The shape control layer may include an electro-active polymer (EAP).

According to some embodiments, the pixels may each include a first sub-pixel in which the light source is red light, a second sub-pixel in which the light source is green light, and a third sub-pixel in which the light source is blue light source.

According to some embodiments, shape control layers of the first sub-pixel, the second sub-pixel, and the third sub-pixel may be spaced apart from each other.

According to some embodiments, the shape control layers of the first sub-pixel, the second sub-pixel, and the third sub-pixel may be in contact with each other.

According to some embodiments, in each of the pixels, the transparent electrode may be provided in plurality and spaced apart from each other.

According to some embodiments, in each of the pixels, the control unit may be provided in plurality and spaced apart from each other.

According to some embodiments, the display device may further include a partition wall on the backplane. The shape control layer of each of the pixels may be spaced apart from each other with the partition wall therebetween.

A display device according to some embodiments of the present invention may include a backplane, a partition wall on the backplane, and a plurality of pixels on the backplane. The pixels may each include a first sub-pixel, a second sub-pixel, and a third sub-pixel. The first sub-pixel, the second sub-pixel, and the third sub-pixel may each include a control unit on the backplane, a transparent electrode connected to the control unit, and a shape control layer on the transparent electrode. The first sub-pixel may further include a red light source between the backplane and the control unit. The second sub-pixel may further include a green light source between the backplane and the control unit. The third sub-pixel may further include a blue light source between the backplane and the control unit. The control unit may control a voltage of the transparent electrode. The shape control layer may include an electro-active polymer (EAP).

According to some embodiments, the shape control layers of the first, second, and third sub-pixels may be spaced apart from each other with the partition wall therebetween.

According to some embodiments, the number of the transparent electrodes included in each of the first, second, and third sub-pixels may be two or more.

According to some embodiments, the number of the control units included in each of the first, second, and third sub-pixels may be two or more.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
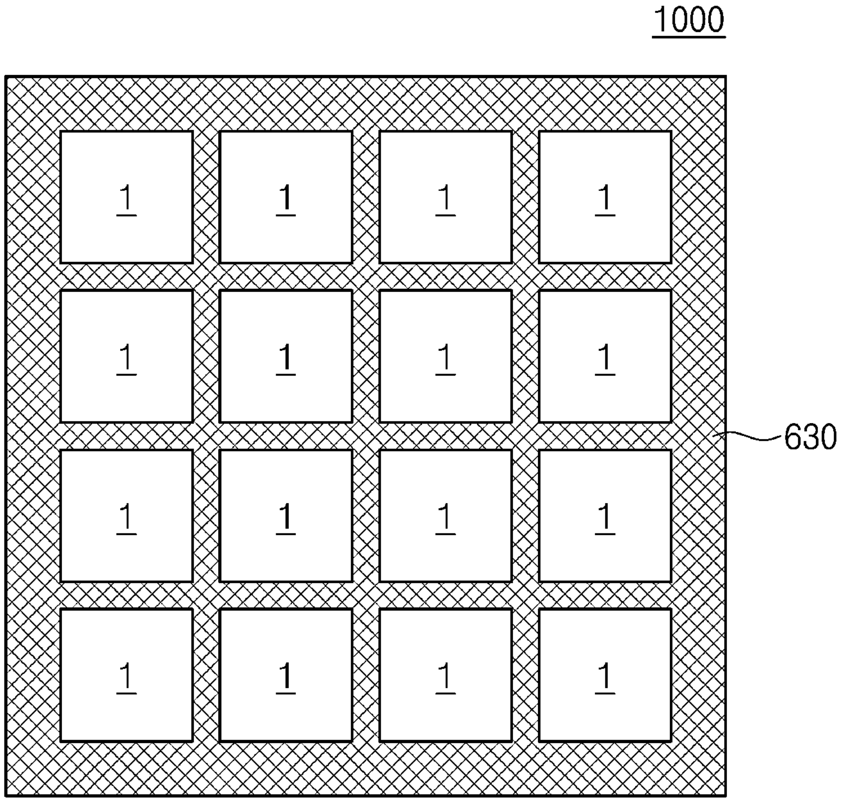
FIG. 1 is a plan view of a display device according to some embodiments of the inventive concept.

In order to facilitate sufficient understanding of the configuration and effects of the present invention, preferred embodiments of the inventive concept will be described with reference to the accompanying drawings. However, the inventive concept is not limited to the embodiments set forth below, and may be embodied in various forms and modified in many alternate forms. Rather, these embodiments are provided so that this disclosure will be thorough and complete, and will fully convey the scope of the present invention to those skilled in the art to which the present invention pertains. In the accompanying drawings, elements are illustrated enlarged from the actual size thereof for convenience of description, and the ratio of each element may be exaggerated or reduced.

Like reference numerals refer to substantially like elements throughout the specification.

In the following description, detailed descriptions of components and functions known in the technical field of the present invention may be omitted if they are not related to core components of the present invention. The meanings of the terms described in the present specification should be understood as follows.

Shapes, sizes, ratios, angles, numbers, and the like disclosed in the drawings of the present invention are illustrative, so that the present invention is not limited to the illustrated details.

In addition, in describing the present invention, if it is determined that a detailed description of a related known technology may unnecessarily obscure the gist of the present invention, the detailed description will be omitted.

If the terms 'includes,' 'has,' 'consists of,' and the like are used in the present specification, other parts may be added unless 'only' is used. Elements of a singular form may include elements plural forms unless the context clearly indicates otherwise.

In interpreting elements, it is to be construed as including an error range even if there is no separate explicit recitation.

If the description is of a positional relationship, e.g., if a positional relationship between two portions is described by 'on~,' 'upper~,' 'lower~,' 'next to~,' etc., one or more other portions may be disposed between the two portions unless 'right' or 'directly' is used.

If the description is of a temporal relationship, e.g., if a temporal antecedent relationship is described by 'afterward,' 'after~,' 'subsequent to~,' 'following~,' 'before~,' etc., it may also include a case of a non-continuous temporal relationship unless 'immediately' or 'directly' is used.

It will be understood that, although the terms 'first,' 'second,' etc., are used herein to describe various elements, these elements should not be limited by these terms. These terms are only used to distinguish one element from another. Therefore, a first element mentioned hereinafter may be a second element within the technical spirit of the present invention.

The term "at least one" should be understood as including all possible combinations from one or more related items. For example, the meaning of "at least one of a first item, a second item, and a third item" may mean not only the first item, the second item, or the third item itself, but also all possible combinations of items to be proposed from two or more of the first item, the second item, and the third item.

Hereinafter, preferred embodiments of the present invention will be described in detail with reference to the accompanying drawings.

Figure 2:
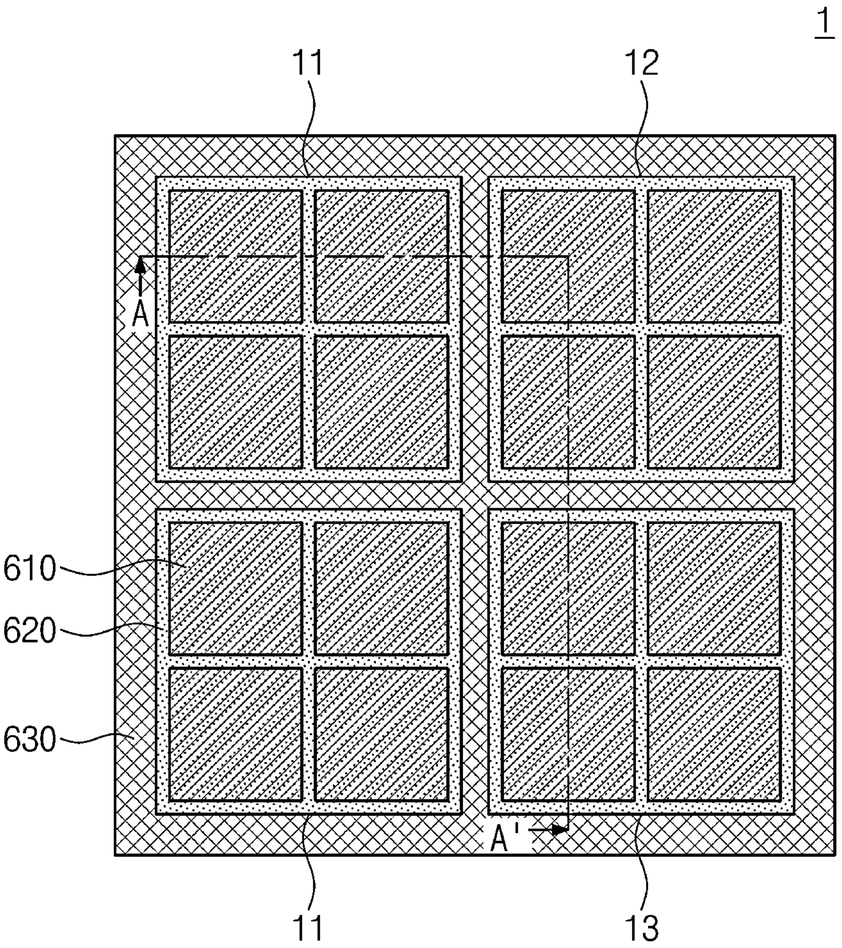
FIG. 2 is a plan view of a pixel in FIG. 1.
Figure 3:
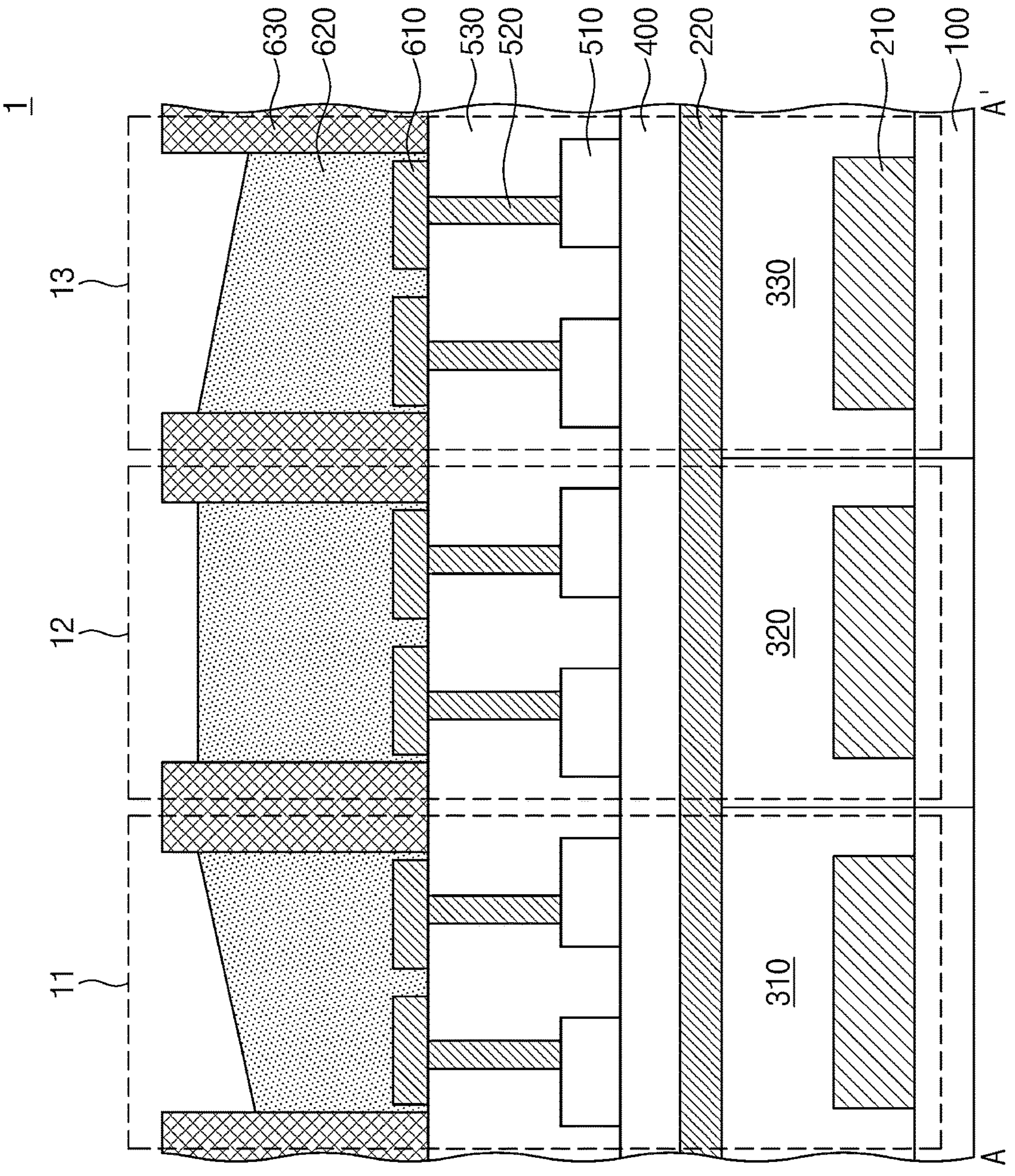
FIG. 3 is a cross-sectional view of line A-A' in FIG. 2.

FIG. 1 is a plan view of a display device according to some embodiments of the inventive concept. FIG. 2 is a plan view of a pixel in FIG. 1. FIG. 3 is a cross-sectional view of line A-A' in FIG. 2.

Referring to FIG. 1 to FIG. 3, a display device 1000 according to some embodiments of the present invention may be provided.

The display device 1000 may include a backplane 100, a partition wall 630, and a pixel 1 on the backplane 100.

The backplane 100 may include a transistor. The backplane 100 may control the brightness of a light source to be described later. The backplane 100 may be formed by a complementary metal oxide semiconductor (CMOS) process and/or a thin film transistor (TFT) process.

The pixel 1 may be provided on the backplane 100. The pixel 1 is illustrated as a quadrangle, but is not limited thereto. The pixel 1 may be provided in plurality. The plurality of pixels 1 may be spaced apart from each other with a partition wall 630 interposed therebetween.

The partition wall 630 may be provided on the backplane 100. The height of the partition wall 630 may be equal to or higher than the height of the pixels 1. The partition wall 630 may include one or more selected from the group consisting of an inorganic thin film, an organic thin film, and an organic/inorganic composite thin film. The partition wall 630 may have a single-layered structure or a multi-layered structure.

The inorganic thin film may include, for example, one or more selected from the group consisting of silicon oxide (SiO), silicon nitride (SiN, silicon oxynitride (SiON), aluminum oxide (AlO), and hafnium oxide (HfO), but is not limited thereto. The organic thin film may include, for example, one or more selected from the group consisting of a poly vinyl chloride (PVC) resin, a vinyl acetate (VA) resin, a polystyrene (PS) resin, a polyamide (PA) resin, a polyimide (PI) resin, a methacrylic acid (MAA) resin, a melamine resin, a polyurethane (PU) resin, a polyethylene resin, an ethylene vinyl copolymer resin, a polypropylene (PP) resin, a polyester resin, an acrylic resin, nylon, a polycarbonate (PC) resin, and cellulose, but is not limited thereto. The organic/inorganic composite thin film may include, for example, one or more selected from the group consisting of hexamethyldisiloxane, polysilazane, polysiloxane, and polysilsesquioxane, but is not limited thereto.

The ethylene vinyl copolymer resin may include, for example, an ethylene vinyl acetate (EVA) copolymer resin. The acrylic resin may include, for example, one or more selected from the group consisting of a poly methyl methacrylate (PMMA) resin, a polyacrylonitrile (PAN) resin, and a polyacrylic acid (PAA) resin.

The pixel 1 may include sub-pixels 11, 12, and 13. The sub-pixels 11, 12, and 13 are illustrated as quadrangles, but are not limited thereto. The sub-pixels 11, 12, and 13 may be provided in plurality on the backplane 100. The pixel 1 is illustrated as including four sub-pixels 11, 12, and 13 disposed in a 2×2 grid shape, but is not limited thereto. The plurality of sub-pixels 11, 12, and 13 may be spaced apart from each other with the partition wall 630 interposed therebetween.

The pixel 1 may include a first sub-pixel 11, a second sub-pixel 12, and a third sub-pixel 13. The pixel 1 is illustrated as including two first sub-pixels 11, one second sub-pixel 12, and one third sub-pixel 13, but is not limited thereto. For example, although not illustrated, the pixel 1 may include one first sub-pixel 11, two second sub-pixels 12, and one third sub-pixel 13. For example, although not illustrated, the pixel 1 may include one first sub-pixel 11, one second sub-pixel 12, and two third sub-pixels 13. The first, second, and third sub-pixels 11, 12, and 13 may be distinguished according to colors of light sources 310, 320, and 330 to be described later.

The sub-pixels 11, 12, and 13 may each include a first electrode 210, the light sources 310, 320, and 330, an intermediate layer 400, a control unit 510, a via 520, an insulating layer 530, a transparent electrode 610, and a shape control layer 620.

The first electrode 210 may be provided on the backplane 100. The pixel 1 may include a plurality of first electrodes 210. The sub-pixels 11, 12, and 13 may each include one first electrode 210.

The first electrodes 210 may reflect light of corresponding light sources 310, 320, and 330 upward, respectively.

The first electrode 210 may include an electrode material. The electrode material may include a metal, and for example, may include one or more selected from the group consisting of silver (Ag), aluminum (Al), molybdenum (Mo), cobalt (Co), copper (Cu), gold (Au), platinum (Pt), tungsten (W), chromium (Cr), magnesium (Mg), and lithium (Li).

The first electrode 210 may further include a transparent conductive material. If the first electrode 210 further includes a transparent conductive material, charge injection properties and light efficiency thereof may be improved. The transparent conductive material may include one or more selected from the group consisting of a transition metal oxide, a metal nitride, indium tin oxide, and aluminum-doped zinc oxide.

The transition metal oxide may include, for example, one or more selected from the group consisting of molybdenum oxide (MoO), vanadium oxide (VO), tungsten oxide (WO), nickel oxide (NiO), and rhenium oxide (ReO). The metal nitride may include, for example, titanium nitride (TiN).

The first electrode 210 may further include a conductive polymer, copper iodide, copper thiocyanate, and/or a graphene thin film. The conductive polymer may include one or more selected from the group consisting of polypyrrole, polyaniline, polythiophene, and poly-sodium allyloxy hydroxypropyl sulfonate.

The first electrode 210 may be formed by a sputtering process, a thermal deposition process, a chemical vapor deposition (CVD) process, an atomic layer deposition (ALD) process, a spin coating process, a bar coating process, a blade coating process, plating, a slit coating process, a slot die coating process, and/or a printing process.

The light sources 310, 320, and 330 may be provided on the backplane 100. The light sources 310, 320, and 330 may be provided between the first electrodes 210 and the control unit 510 to be described later. The light sources 310, 320, and 330 may be provided in plurality. The light sources 310, 320, and 330 may emit light. The light sources 310, 320, and 330 may include a first light source 310 configured to emit red light, a second light source 320 configured to emit green light, and a third light source 330 configured to emit blue light. The light sources 310, 320, and 330 may include two or more elements, and may each include one or more selected from the group consisting of gallium arsenide (GaAs), gallium phosphide (GaP), gallium arsenide phosphide (GaAsP), and gallium nitride (GaN), but are not limited thereto.

The first sub-pixel 11 may include the first light source 310. In other words, the first sub-pixel 11 may emit red light. The second sub-pixel 12 may include the second light source 320. In other words, the second sub-pixel 12 may emit green light. The third sub-pixel 13 may include the third light source 330. In other words, the third sub-pixel 13 may emit blue light.

The light sources 310, 320, and 330 may each have high straightness in an upward direction. For example, the light sources 310, 320, and 330 may each have an absolute value of half beam angle of 5° or less, 4° or less, 3° or less, 2° or less, or 1° or less.

A second electrode 220 may be provided on the light sources 310, 320, and 330. The pixel 1 may include one second electrode 220. The second electrode 210 may include an electrode material. The electrode material may include a metal, and for example, may include one or more selected from the group consisting of silver (Ag), aluminum (Al), molybdenum (Mo), cobalt (Co), copper (Cu), gold (Au), platinum (Pt), tungsten (W), chromium (Cr), magnesium (Mg), and lithium (Li).

The second electrode 220 may further include a transparent conductive material. If the second electrode 220 further includes a transparent conductive material, charge injection properties and light efficiency thereof may be improved. The transparent conductive material may include one or more selected from the group consisting of a transition metal oxide, a metal nitride, indium tin oxide, and aluminum-doped zinc oxide.

The transition metal oxide may include, for example, one or more selected from the group consisting of molybdenum oxide (MoO), vanadium oxide (VO), tungsten oxide (WO), nickel oxide (NiO), and rhenium oxide (ReO). The metal nitride may include, for example, titanium nitride (TiN).

The second electrode 220 may further include a conductive polymer, copper iodide, copper thiocyanate, and/or a graphene thin film. The conductive polymer may include one or more selected from the group consisting of polypyrrole, polyaniline, polythiophene, and poly-sodium allyloxy hydroxypropyl sulfonate.

The second electrode 220 may be formed by a sputtering process, a thermal deposition process, a chemical vapor deposition (CVD) process, an atomic layer deposition (ALD) process, a spin coating process, a bar coating process, a blade coating process, plating, a slit coating process, a slot die coating process, and/or a printing process.

The intermediate layer 400 may be provided on the second electrode 220. The intermediate layer 400 may be interposed between the light sources 310, 320, and 330 and the control unit 510 to be described later. The intermediate layer 400 may insulate the light sources 310, 320, and 330 from the control unit 510 to be described later.

The intermediate layer 400 may include one or more selected from the group consisting of an inorganic thin film, an organic thin film, and an organic/inorganic composite thin film. The intermediate layer 400 may have a single-layered structure or a multi-layered structure.

The inorganic thin film may include, for example, one or more selected from the group consisting of silicon oxide (SiO), silicon nitride (SiN, silicon oxynitride (SiON), aluminum oxide (AlO), and hafnium oxide (HfO), but is not limited thereto. The organic thin film may include, for example, one or more selected from the group consisting of a poly vinyl chloride (PVC) resin, a vinyl acetate (VA) resin, a polystyrene (PS) resin, a polyamide (PA) resin, a polyimide (PI) resin, a methacrylic acid (MAA) resin, a melamine resin, a polyurethane (PU) resin, a polyethylene resin, an ethylene vinyl copolymer resin, a polypropylene (PP) resin, a polyester resin, an acrylic resin, nylon, a polycarbonate (PC) resin, and cellulose, but is not limited thereto. The organic/inorganic composite thin film may include, for example, one or more selected from the group consisting of hexamethyldisiloxane, polysilazane, polysiloxane, and polysilsesquioxane, but is not limited thereto.

The ethylene vinyl copolymer resin may include, for example, an ethylene vinyl acetate (EVA) copolymer resin. The acrylic resin may include, for example, one or more selected from the group consisting of a poly methyl methacrylate (PMMA) resin, a polyacrylonitrile (PAN) resin, and a polyacrylic acid (PAA) resin.

The control unit 510 may be provided on the intermediate layer 400. The control unit 510 may be connected to the via 520 to be described later and the transparent electrode 610 to be described later to apply an individual voltage to the shape control layer 620 to be described later. The pixel 1 may include one or a plurality of control units 510. In FIG. 3, each of the sub-pixels 11, 12, and 13 is illustrated as including four quadrangular control units 510 disposed in a 2×2 grid shape, but is not limited to the shape or number thereof. The control units 510 may each include a transistor. The control units 510 may each be formed by, for example, a thin film transistor (TFT) process.

The via 520 may be provided on the control unit 510. The pixel 1 may include one or a plurality of vias 520. In FIG. 3, the vias 520 are illustrated in plurality, but are not limited to the number thereof. The vias 520 may be respectively connected to corresponding control units 510. The via 520 may electrically connect the corresponding control unit 510 and the transparent electrode 610 to be described later.

The insulating layer 530 may be provided on the intermediate layer 400. The insulating layer 530 may be provided between the control unit 510 and the transparent electrode 610 to be described later, and may insulate a surface of the control unit 510 not connected to the via 520 and a side surface of the via.

The insulating layer 530 may include one or more selected from the group consisting of an inorganic thin film, an organic thin film, and an organic/inorganic composite thin film. The insulating layer 530 may have a single-layered structure or a multi-layered structure.

The inorganic thin film may include, for example, one or more selected from the group consisting of silicon oxide (SiO), silicon nitride (SiN, silicon oxynitride (SiON), aluminum oxide (AlO), and hafnium oxide (HfO), but is not limited thereto. The organic thin film may include, for example, one or more selected from the group consisting of a poly vinyl chloride (PVC) resin, a vinyl acetate (VA) resin, a polystyrene (PS) resin, a polyamide (PA) resin, a polyimide (PI) resin, a methacrylic acid (MAA) resin, a melamine resin, a polyurethane (PU) resin, a polyethylene resin, an ethylene vinyl copolymer resin, a polypropylene (PP) resin, a polyester resin, an acrylic resin, nylon, a polycarbonate (PC) resin, and cellulose, but is not limited thereto. The organic/inorganic composite thin film may include, for example, one or more selected from the group consisting of hexamethyldisiloxane, polysilazane, polysiloxane, and polysilsesquioxane, but is not limited thereto.

The ethylene vinyl copolymer resin may include, for example, an ethylene vinyl acetate (EVA) copolymer resin. The acrylic resin may include, for example, one or more selected from the group consisting of a poly methyl methacrylate (PMMA) resin, a polyacrylonitrile (PAN) resin, and a polyacrylic acid (PAA) resin.

The transparent electrode 610 may be provided on the via 520. The pixel 1 may include one or a plurality of transparent electrodes 610. In FIG. 2, each of the sub-pixels 11, 12, and 13 is illustrated as including four quadrangular transparent electrodes 610 disposed in a 2×2 grid shape, but is not limited to the shape or number thereof. Each of the transparent electrodes 610 may be electrically connected to a corresponding control unit 510 through a corresponding via 520.

The transparent electrode 610 may include a transparent conductive material. The transparent conductive material may include one or more selected from the group consisting of a transition metal oxide, a metal nitride, indium tin oxide, and aluminum-doped zinc oxide. The transparent electrode 610 may further include a conductive polymer, copper iodide, copper thiocyanate, and/or a graphene thin film. The conductive polymer may include one or more selected from the group consisting of polypyrrole, polyaniline, polythiophene, and poly-sodium allyloxy hydroxypropyl sulfonate. The transparent electrode 610 may control the shape of the shape control layer 620 by applying a voltage to the shape control layer 620 to be described later.

The shape control layer 620 may be provided on the transparent electrode 610. The shape control layer 620 may be provided on the insulating layer 530 to surround an upper surface and a side surface of the transparent electrode 610.

Referring to FIG. 3, each of the sub-pixels 11, 12, and 13 may include an individual shape control layer 620. In other words, the partition wall 630 may be provided between the sub-pixels 11, 12, and 13, and the partition wall 630 may be provided between the shape control layer 620 of each of the sub-pixels. That is, the shape control layer 620 of each of the sub-pixels 11, 12, and 13 may be spaced apart from each other.

The shape control layer 620 may include an electro-active polymer (EAP). The electro-active polymer may include one or more selected from the group consisting of a conductive polymer, an ionic polymer, Nafion, and Flemion.

The conductive polymer may include one or more selected from the group consisting of polypyrrole, polyaniline, polythiophene, and poly-sodium allyloxy hydroxypropyl sulfonate.

The ionic polymer may include one or more selected from the group consisting of a carbon nanotube, a fluorinated polymer, and a sulfonated polymer.

The fluorinated polymer may include a fluorinated acrylic copolymer.

The sulfonated polymer may include one or more selected from the group consisting sulfonated polystyrene, sulfonated poly(vinyl alcohol), sulfonated poly(arylene ether sulfone), sulfonated ethylene vinyl alcohol copolymer, and sulfonated poly (styrene-b-ethylene-co-butylene-b-styrene).

The display device 1000 according to the present invention may control the thickness of the shape control layer 620 through the transparent electrode 610 controlled by the control unit 510 based on the light sources 310, 320, and 330 having strong straightness and the first electrode 210. Specifically, since the electro-active polymer included in the shape control layer 620 shrinks and expands according to an external voltage, the thickness of the shape control layer 620 in the pixel 1 may vary depending on a zone. As a result, it is possible to provide a stereoscopic image with high resolution, high efficiency, and high luminance by using a thickness difference between each zone.

Hereinafter, other embodiments of the present invention will be described. In order to simplify the description, the same descriptions as those described above will be omitted.

Figure 4:
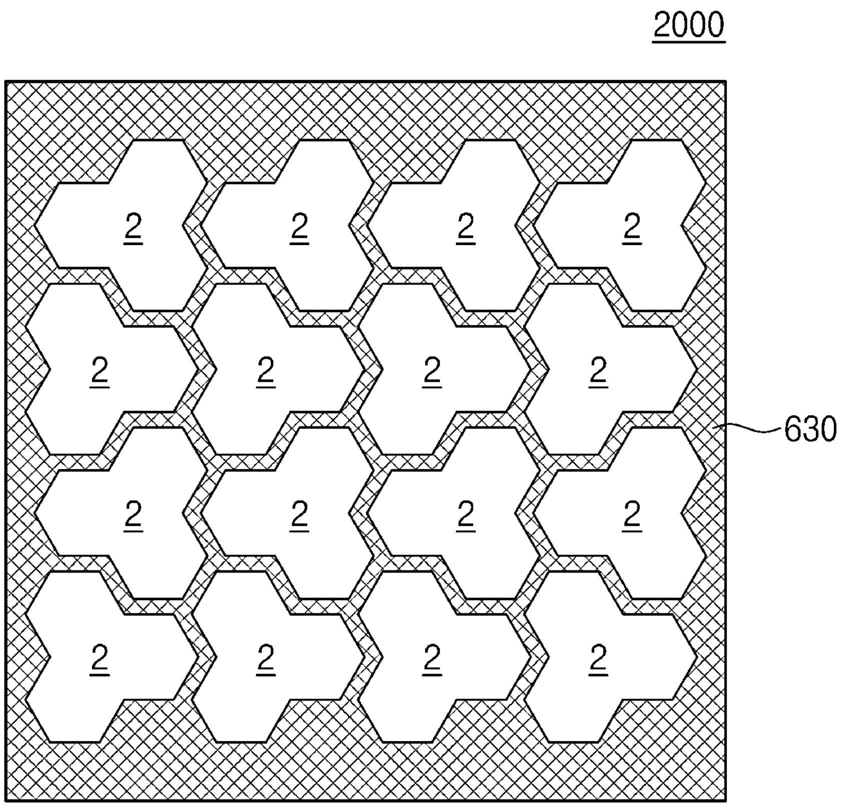
FIG. 4 is a plan view of a display device according to some embodiments of the inventive concept.
Figure 5:
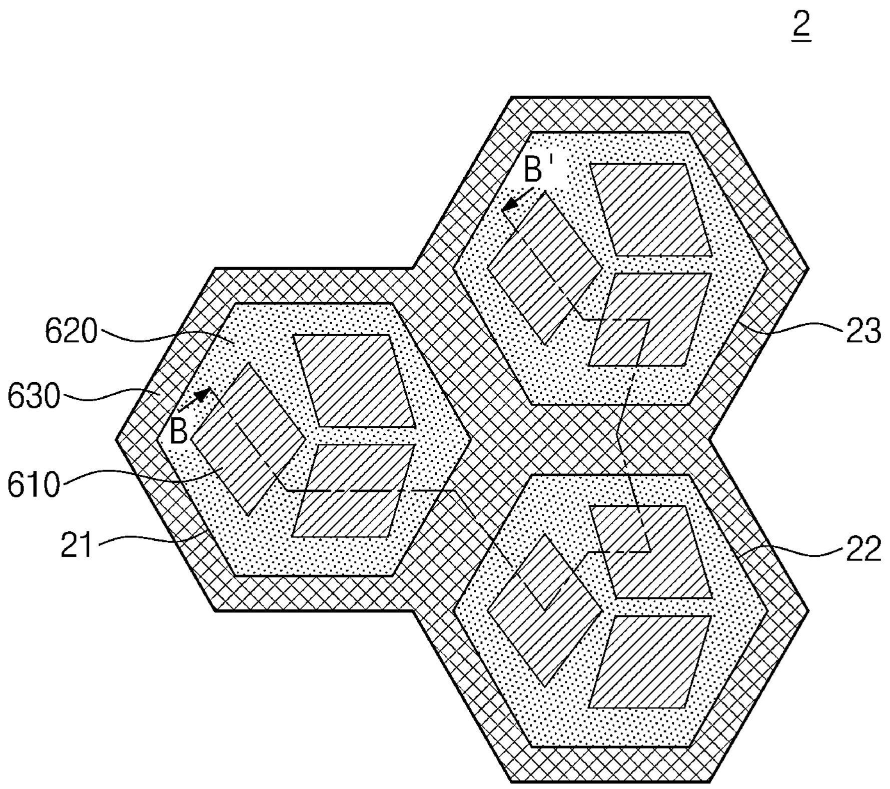
FIG. 5 is a plan view of a pixel in FIG. 4.
Figure 6:
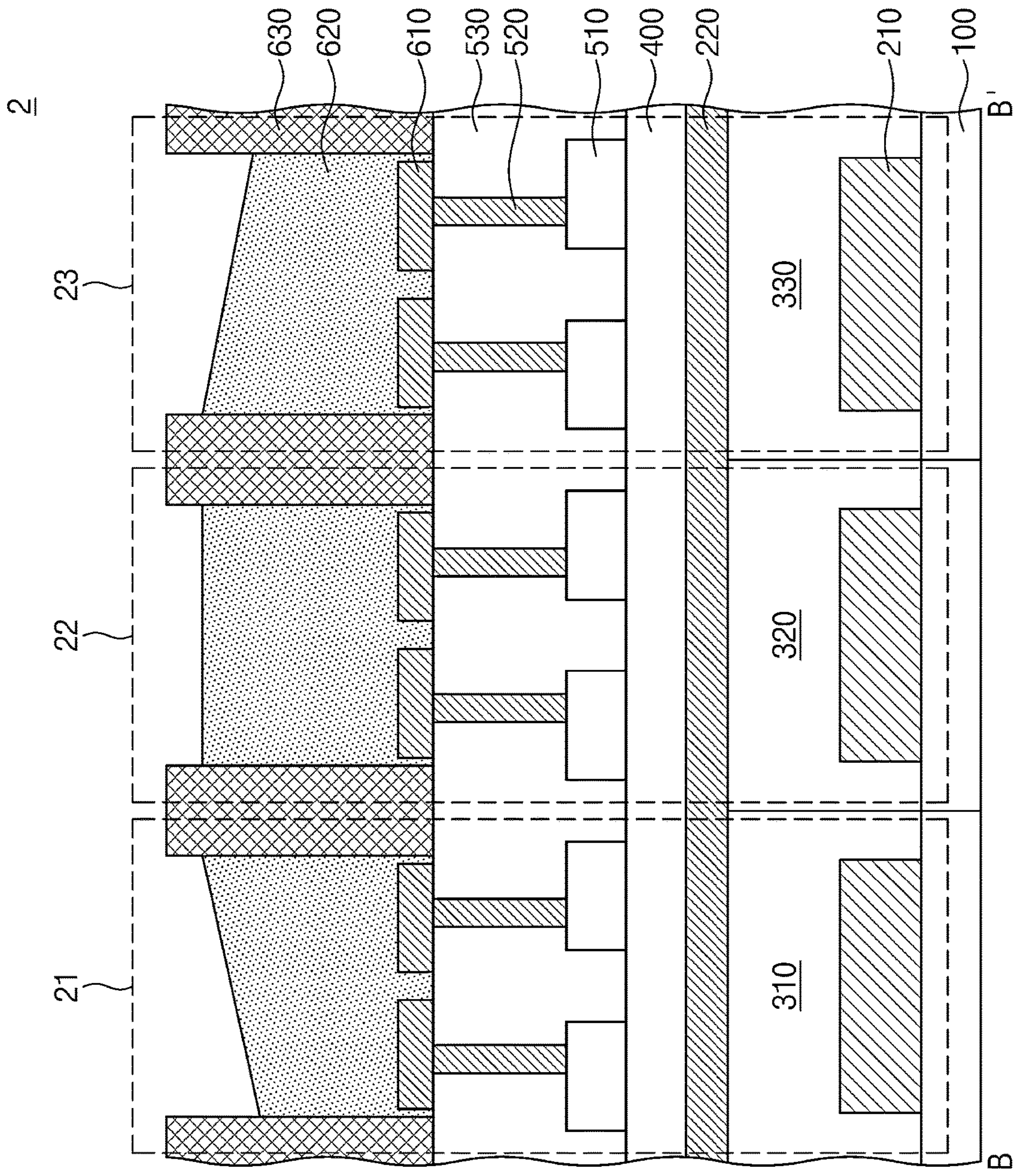
FIG. 6 is a cross-sectional view of line B-B' in FIG. 5.

FIG. 4 is a plan view of a display device according to some embodiments of the inventive concept. FIG. 5 is a plan view of a pixel in FIG. 4. FIG. 6 is a cross-sectional view of line B-B' in FIG. 5.

Referring to FIG. 4 to FIG. 6, a display device 2000 according to some embodiments of the present invention may be provided.

The display device 2000 may include a backplane 100, a partition wall 630, and a pixel 2 on the backplane 100. The pixel 2 may be provided in a dodecagonal shape in which three hexagons are joined together.

Each of the pixels 2 may include three sub-pixels 21, 22, and 23. The sub-pixels 21, 22, and 23 may each be provided in a hexagonal shape.

A reflective electrode 210, a control unit 510, and a transparent electrode 610 may also be provided in a hexagonal shape in the same manner as the sub-pixels 21, 22, and 23.

Figure 7:
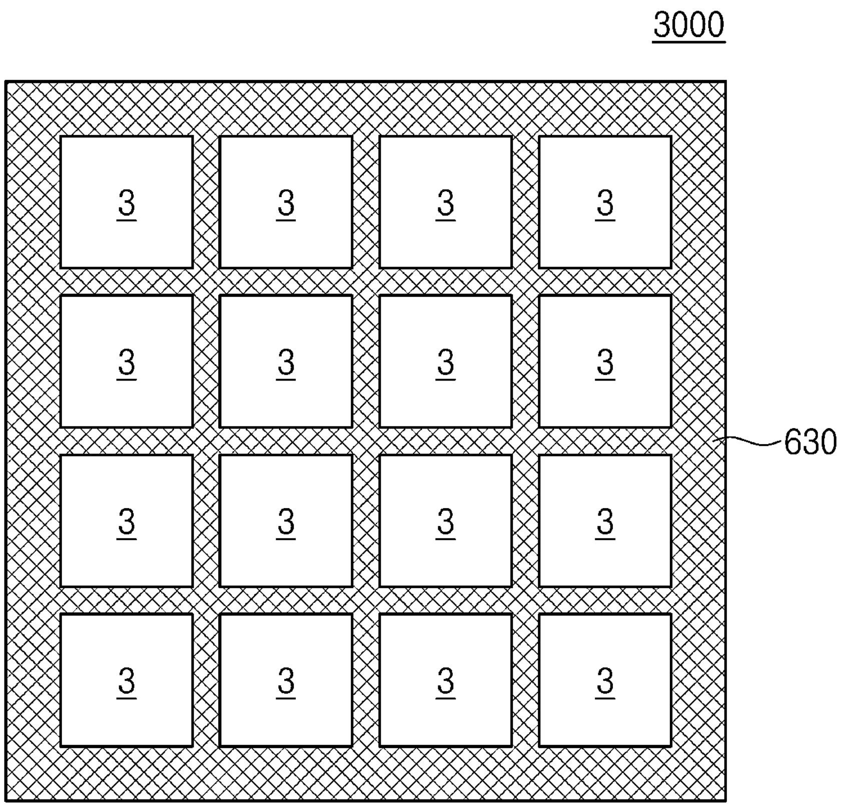
FIG. 7 is a plan view of a display device according to some embodiments of the inventive concept.
Figure 8:
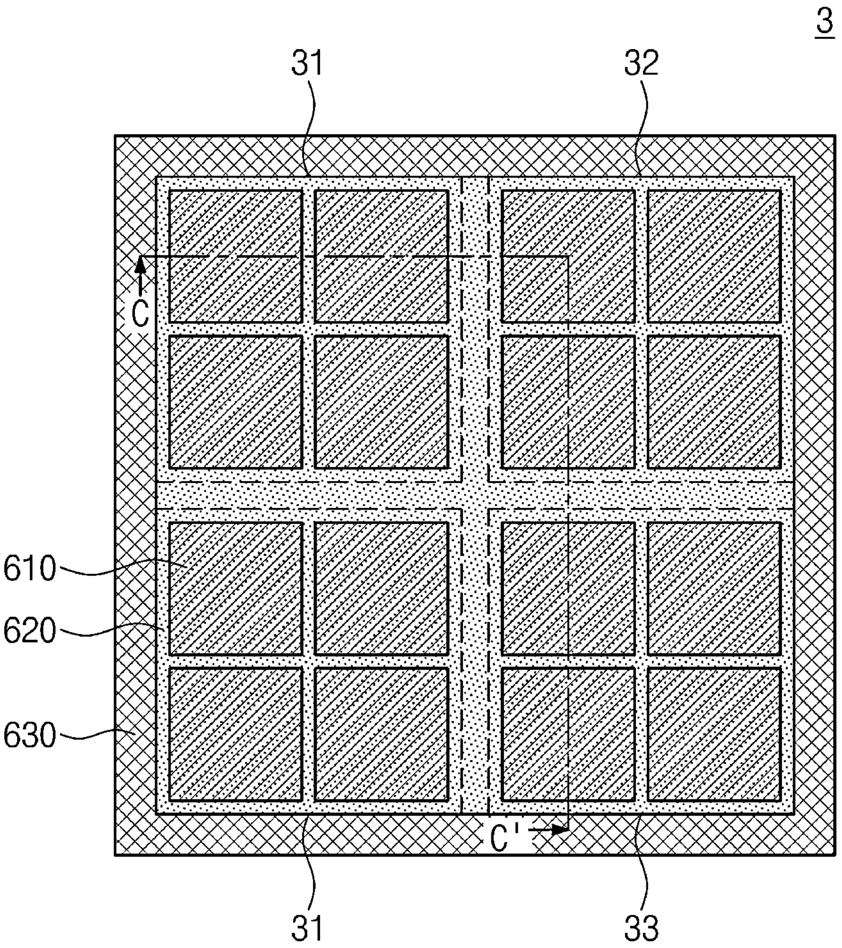
FIG. 8 is a plan view of a pixel in FIG. 7.
Figure 9:
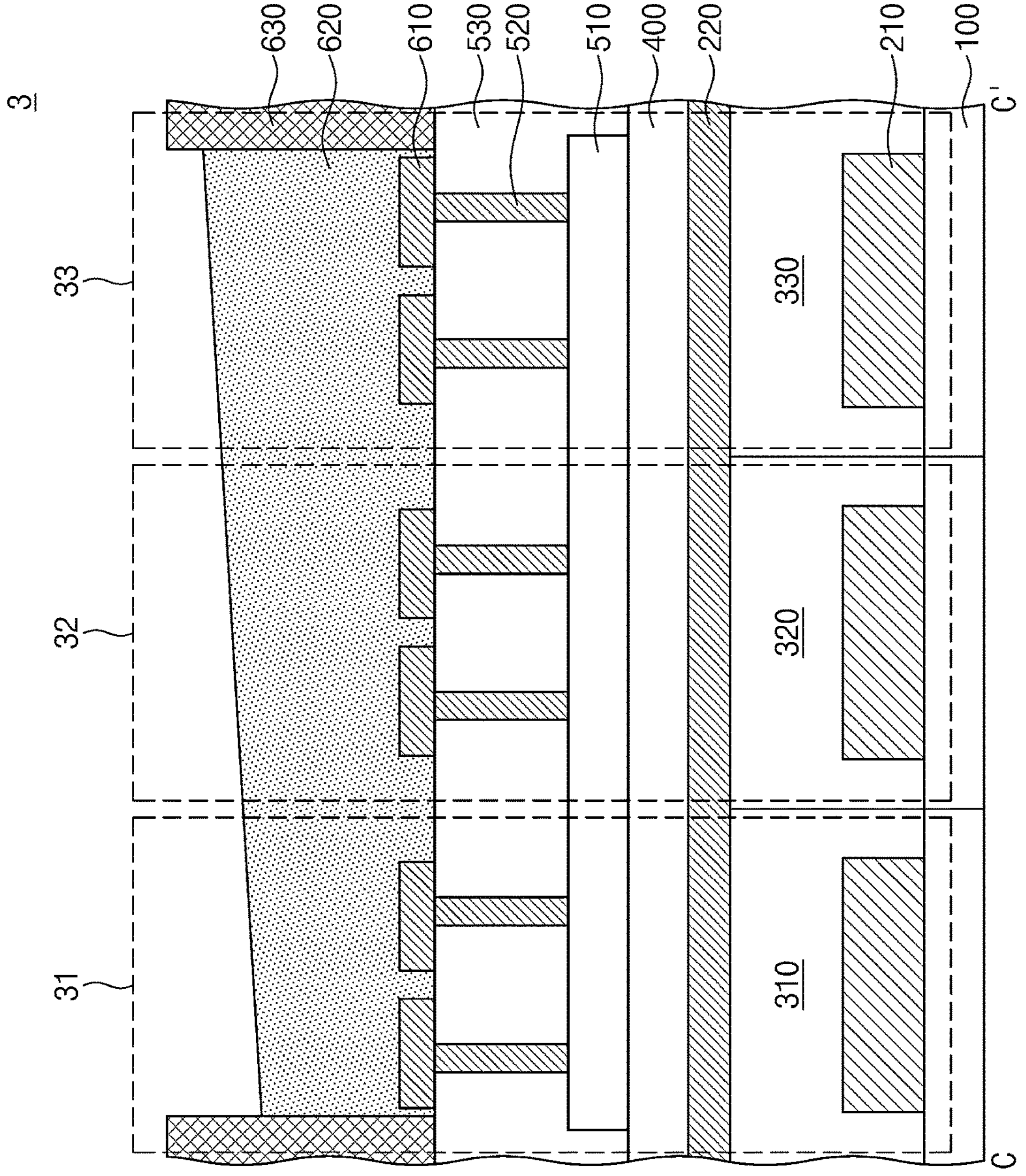
FIG. 9 is a cross-sectional view of line C-C' in FIG. 8.

FIG. 7 is a plan view of a display device according to some embodiments of the inventive concept. FIG. 8 is a plan view of a pixel in FIG. 7. FIG. 9 is a cross-sectional view of line C-C' in FIG. 8.

Referring to FIG. 7 to FIG. 9, a display device 3000 according to some embodiments of the present invention may be provided.

The display device 3000 may include a backplane 100, a partition wall 630, and a pixel 3 on the backplane 100.

The pixel 3 may not have a partition wall 630 between sub-pixels 31, 32, and 33 thereof. That is, one shape control layer 620 may be provided in one pixel 3. In other words, the shape control layer of each of the sub-pixels 31, 32, and 33 may be connected to each other, or may be in contact with each other.

One control unit 510 may be provided in the pixel 3. That is, one control unit 510 may control voltages of a plurality of transparent electrodes 610 through a plurality of vias 520, and may implement a stereoscopic image by using a voltage difference between each of the transparent electrodes.

Figure 10:
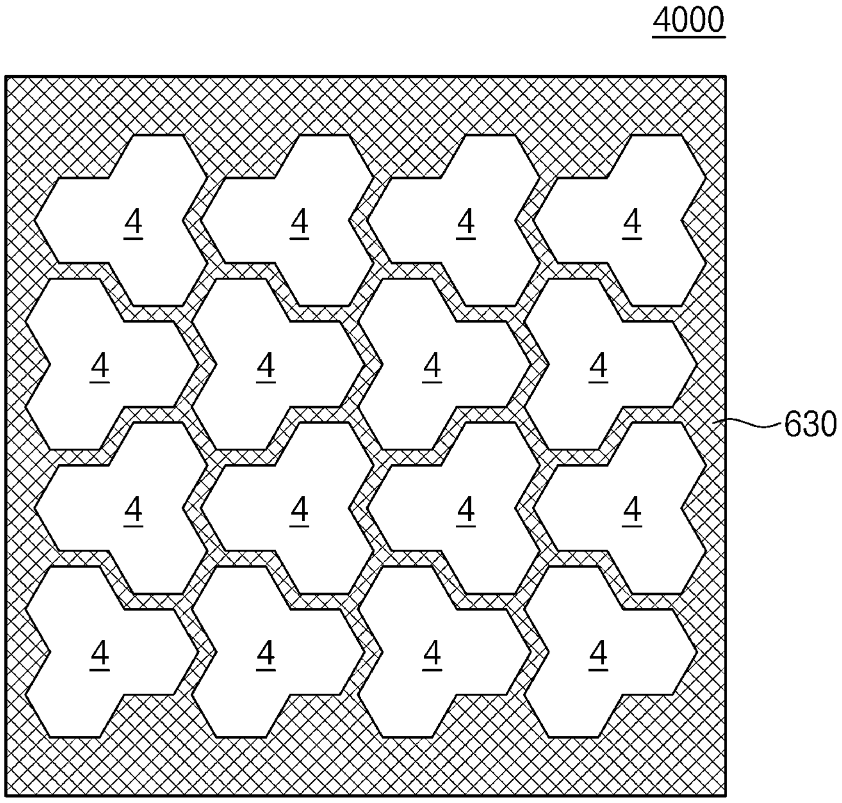
FIG. 10 is a plan view of a display device according to some embodiments of the inventive concept.
Figure 11:
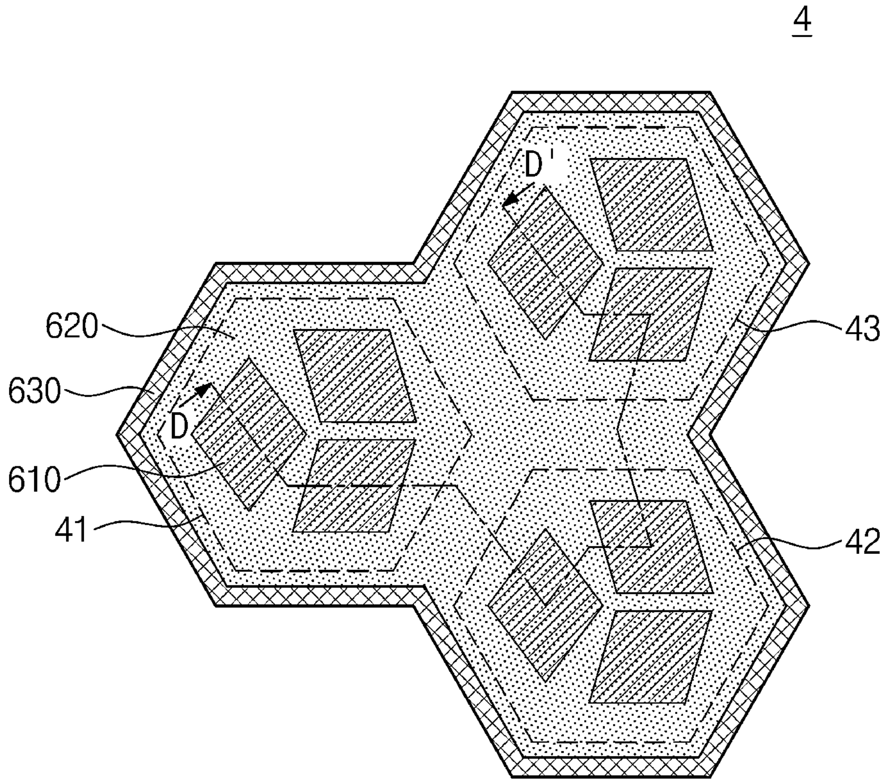
FIG. 11 is a plan view of a pixel in FIG. 10.
Figure 12:
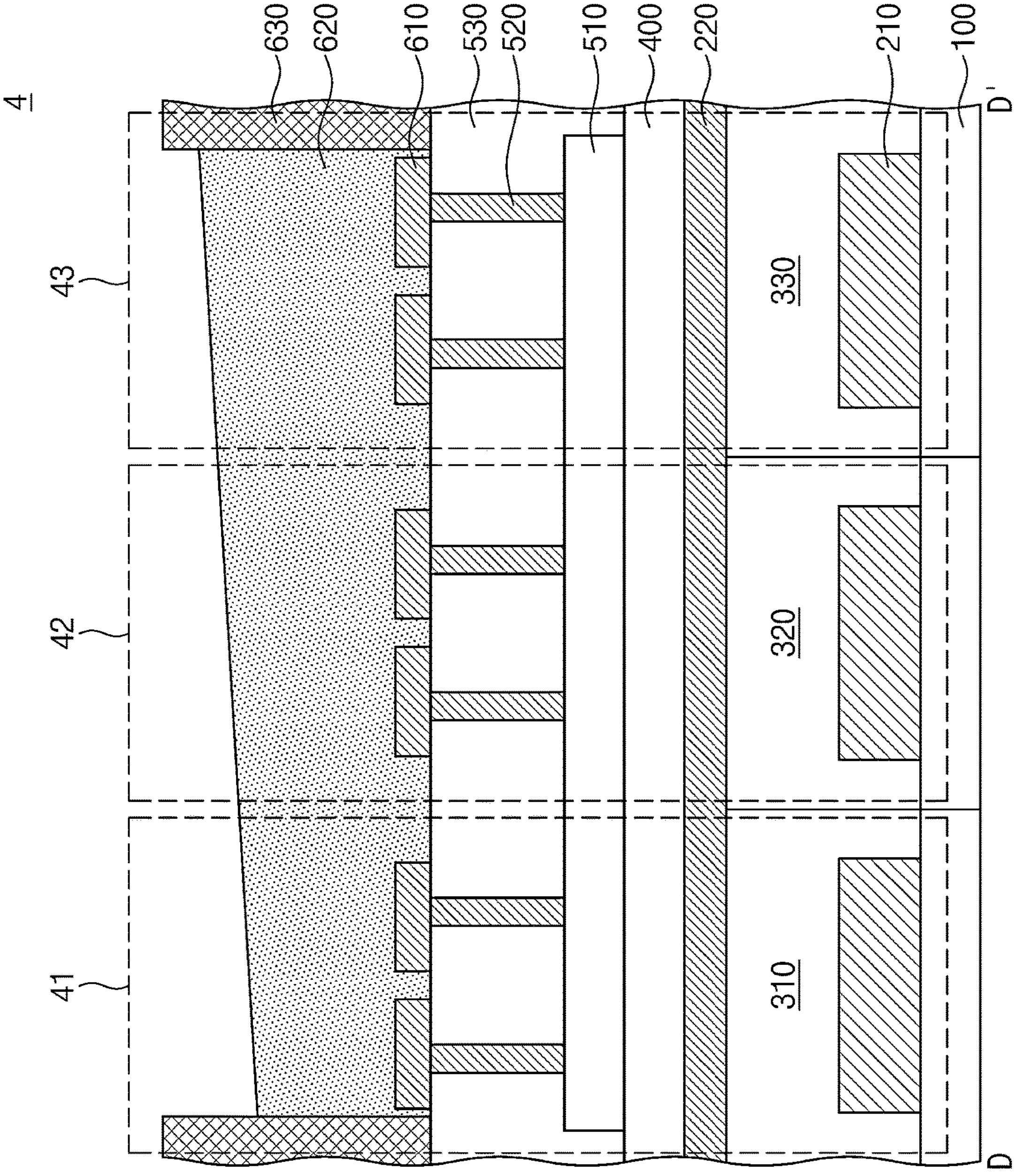
FIG. 12 is a cross-sectional view of line D-D' in FIG. 11.

FIG. 10 is a plan view of a display device according to some embodiments of the inventive concept. FIG. 11 is a plan view of a pixel in FIG. 10. FIG. 12 is a cross-sectional view of line D-D' in FIG. 11.

Referring to FIG. 10 to FIG. 12, a display device 4000 according to some embodiments of the present invention may be provided.

The display device 4000 may include a backplane 100, a partition wall 630, and a pixel 4 on the backplane 100. The pixel 4 may be provided in a dodecagonal shape in which three hexagons are joined together.

Each of the pixels 4 may include three sub-pixels 41, 42, and 43. The sub-pixels 41, 42, and 43 may each be provided in a hexagonal shape.

The pixel 4 may not have a partition wall 630 between the sub-pixels 41, 42, and 43 thereof. That is, one shape control layer 620 may be provided in one pixel 4. In other words, the shape control layer of each of the sub-pixels 41, 42, and 43 may be connected to each other.

One control unit 510 may be provided in the pixel 4. That is, one control unit 510 may control voltages of a plurality of transparent electrodes 610 through a plurality of vias 520, and may implement a stereoscopic image by using a voltage difference between each of the transparent electrodes.

The control unit 510 may be provided in a dodecagonal shape in the same manner as the pixel 4. A reflective electrode 210, and a transparent electrode 610 may be provided in a hexagonal shape in the same manner as the sub-pixels 41, 42, and 43.

Figure 13:
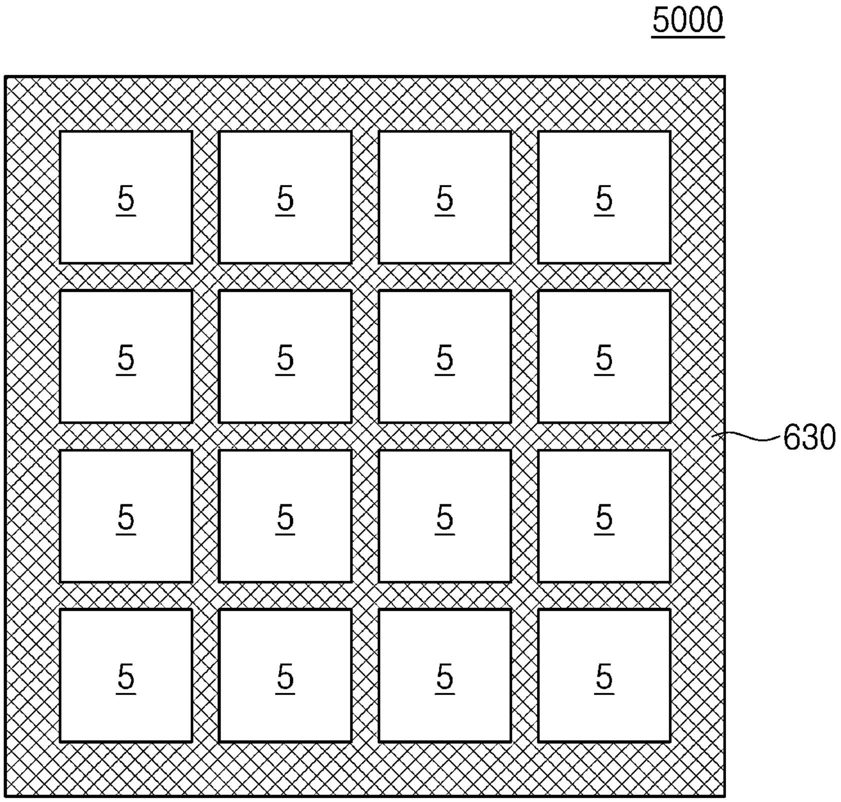
FIG. 13 is a plan view of a display device according to some embodiments of the inventive concept.
Figure 14:
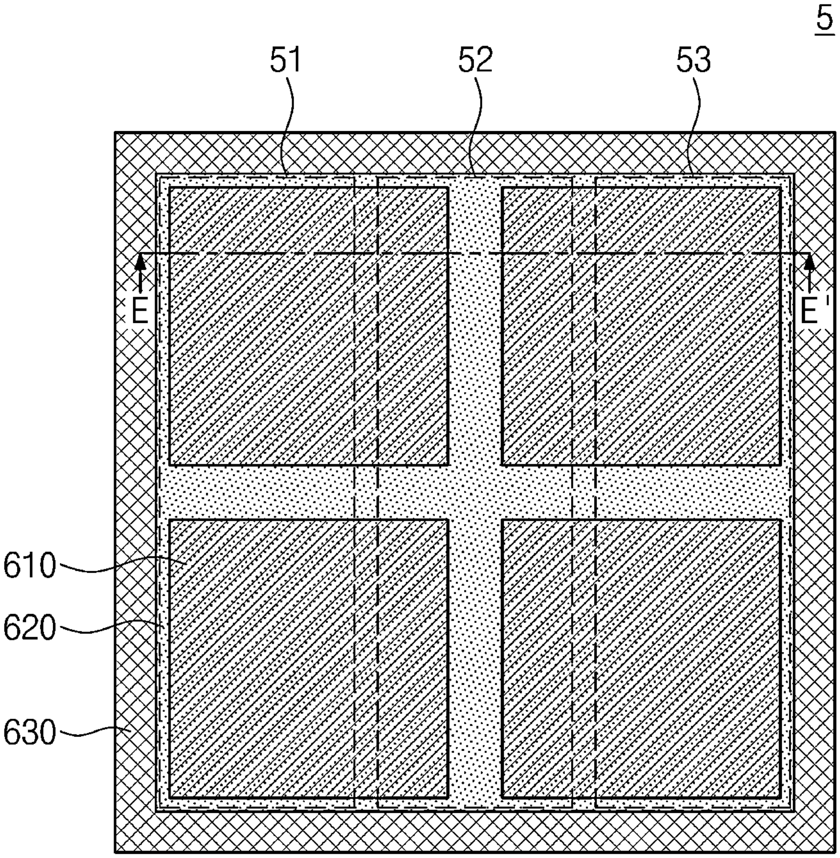
FIG. 14 is a plan view of a pixel in FIG. 13.
Figure 15:
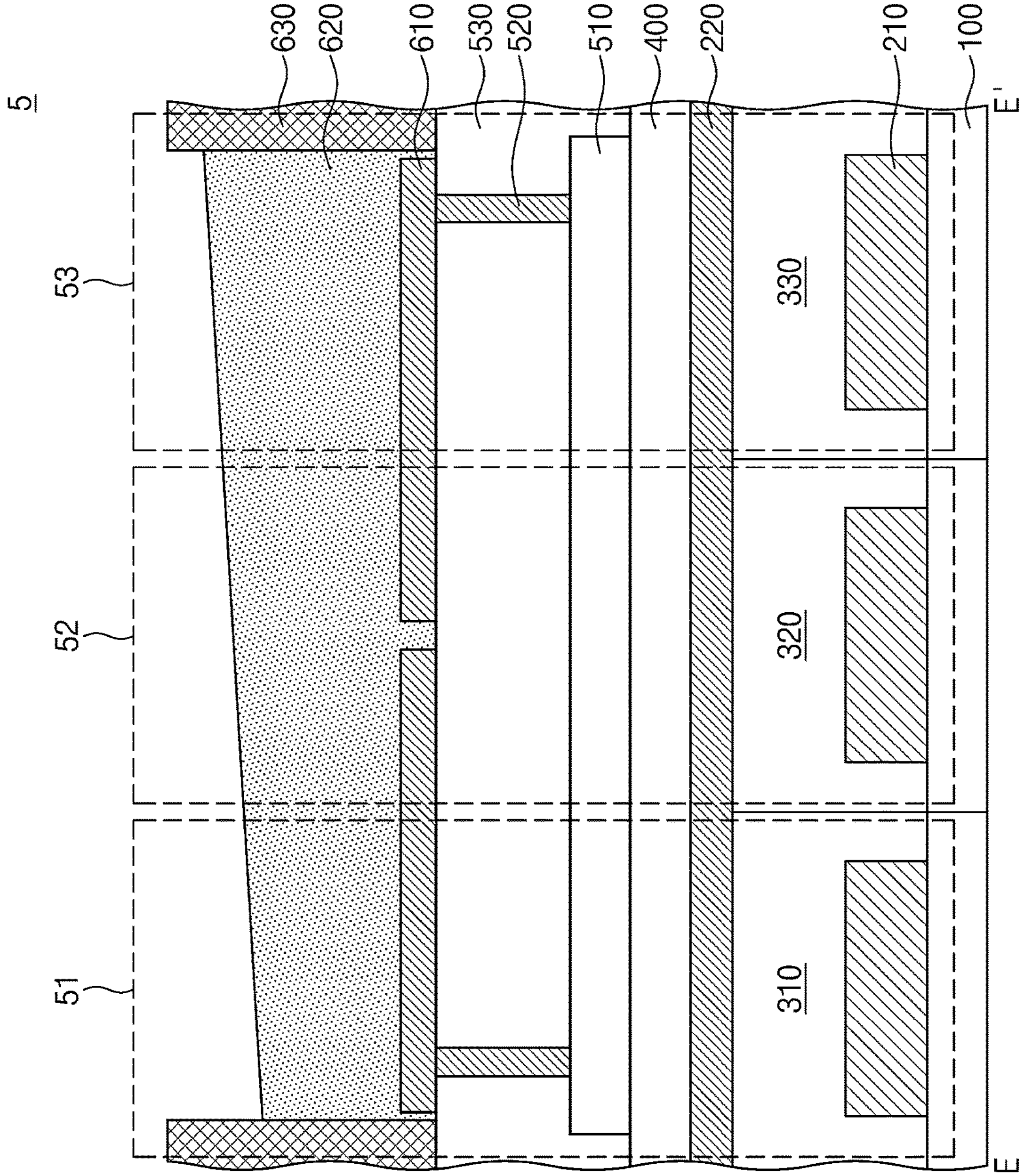
FIG. 15 is a cross-sectional view of line E-E' in FIG. 14.

FIG. 13 is a plan view of a display device according to some embodiments of the inventive concept. FIG. 14 is a plan view of a pixel in FIG. 13. FIG. 15 is a cross-sectional view of line E-E' in FIG. 14.

Referring to FIG. 13 to FIG. 15, a display device 5000 according to some embodiments of the present invention may be provided.

The display device 5000 may include a backplane 100, a partition wall 630, and a pixel 5 on the backplane 100.

The pixel 5 may not have a partition wall 630 between sub-pixels 51, 52, and 53 thereof. That is, one shape control layer 620 may be provided in one pixel 5. In other words, the shape control layer of each of the sub-pixels 51, 52, and 53 may be connected to each other.

The pixel 5 may include three sub-pixels 51, 52, and 53. The three sub-pixels 51, 52, and 53 may be provided in a row in one direction rather than in a grid shape.

One control unit 510 may be provided in the pixel 5. That is, one control unit 510 may control voltages of a plurality of transparent electrodes 610 through a plurality of vias 520, and may implement a stereoscopic image by using a voltage difference between each of the transparent electrodes.

The pixel 5 includes four quadrangular transparent electrodes 610 disposed in a 2×2 grid shape, but is not limited to the shape or number thereof. Referring to FIG. 14, the first sub-pixel 51 may include one portion of any one of the transparent electrodes 610, and the second sub-pixel 52 may include the other portion of the one of the transparent electrodes 610. The second sub-pixel 52 may include one portion of any one of the transparent electrodes 610, and the third sub-pixel 53 may include the other portion of the one of the transparent electrodes 610. That is, one transparent electrode 610 is not limited to being in one sub-pixel 51, 52, or 53 as in the above-described embodiments, but one transparent electrode 610 may be present in a plurality of sub-pixels 51, 52, and 53.

Figure 16:
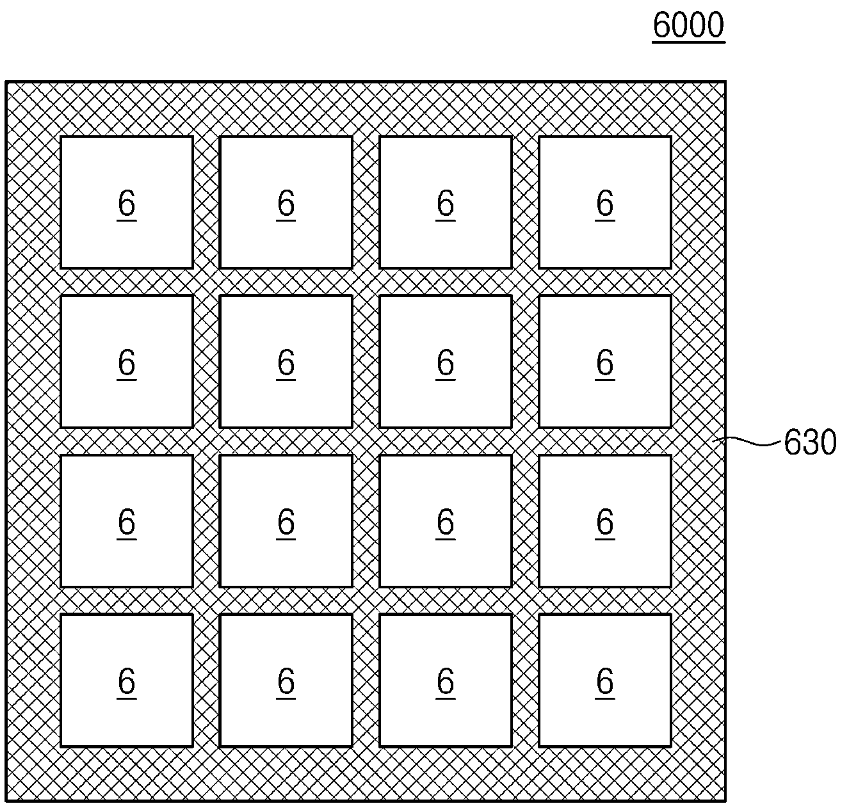
FIG. 16 is a plan view of a display device according to some embodiments of the inventive concept.
Figure 17:
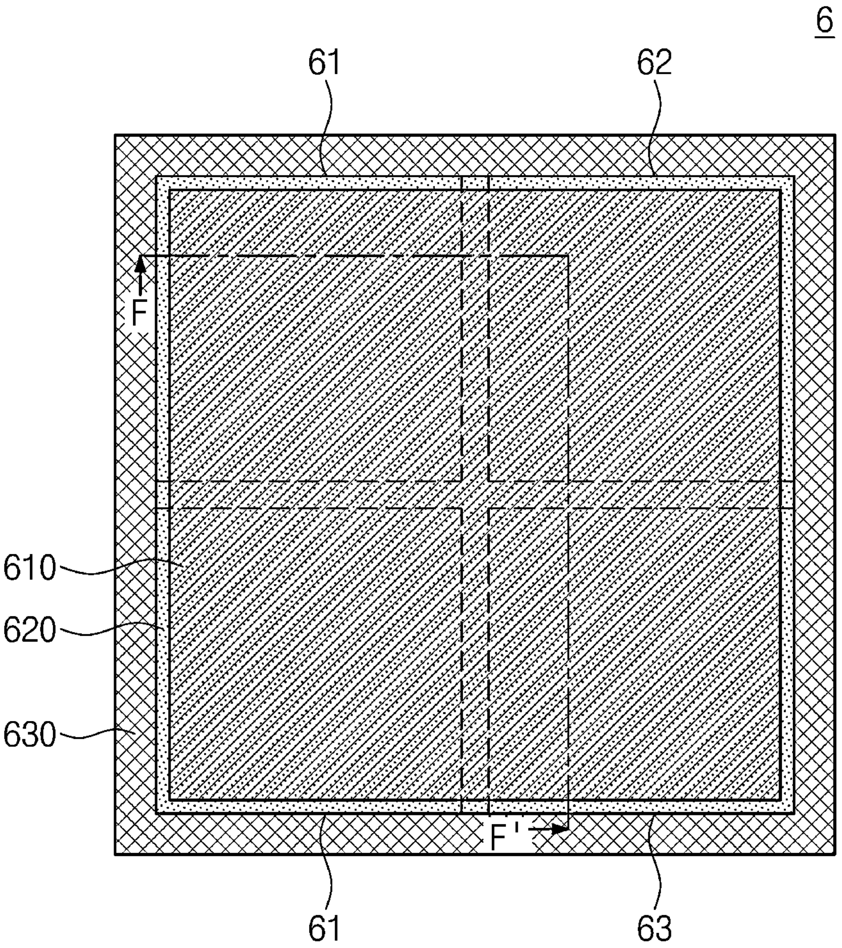
FIG. 17 is a plan view of a pixel in FIG. 16.
Figure 18:
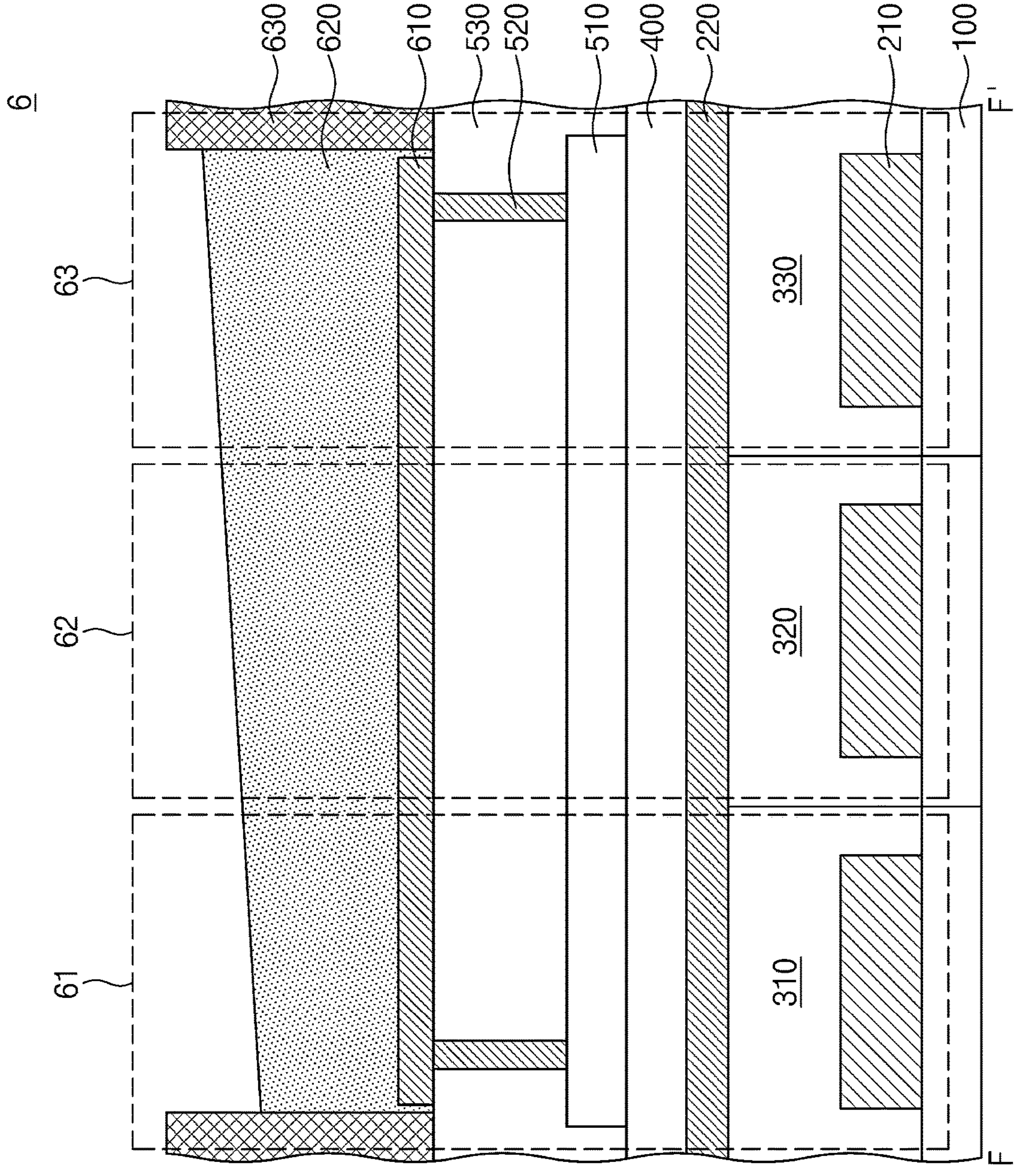
FIG. 18 is a cross-sectional view of line F-F' in FIG. 17.

FIG. 16 is a plan view of a display device according to some embodiments of the inventive concept. FIG. 17 is a plan view of a pixel in FIG. 16. FIG. 18 is a cross-sectional view of line F-F' in FIG. 17.

Referring to FIG. 16 to FIG. 18, a display device 6000 according to some embodiments of the present invention may be provided.

The display device 6000 may include a backplane 100, a partition wall 630, and a pixel 6 on the backplane 100. The pixel 6 is the same in other elements as the pixel 3 of FIGS. 7 to 9, but unlike the pixel 3, only one transparent electrode 610 may be provided in the pixel 6. One or a plurality of vias 520 may be present between one transparent electrode 610 and one control unit 510, and the thickness of the shape control layer 620 may be controlled by applying different voltages to one transparent electrode 610.

Figure 19:
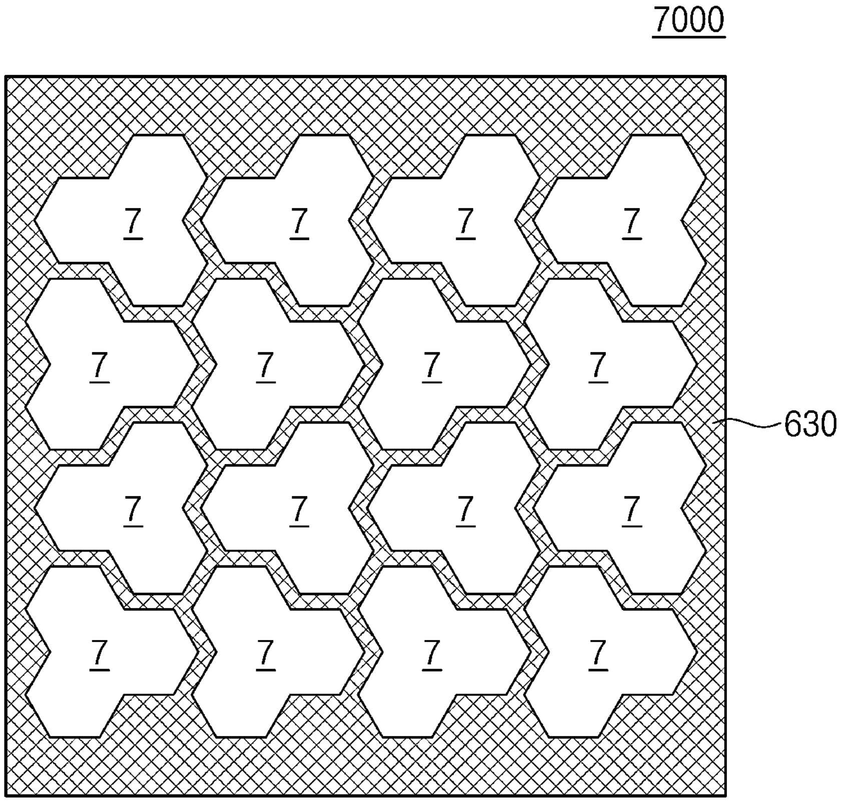
FIG. 19 is a plan view of a display device according to some embodiments of the inventive concept.
Figure 20:
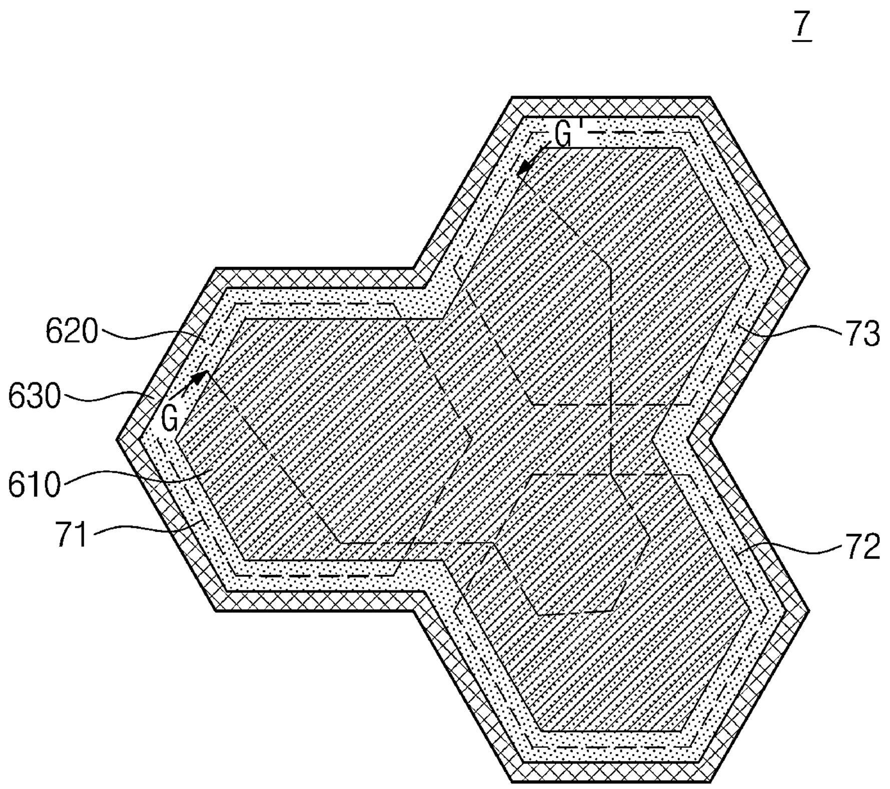
FIG. 20 is a plan view of a pixel in FIG. 19.
Figure 21:
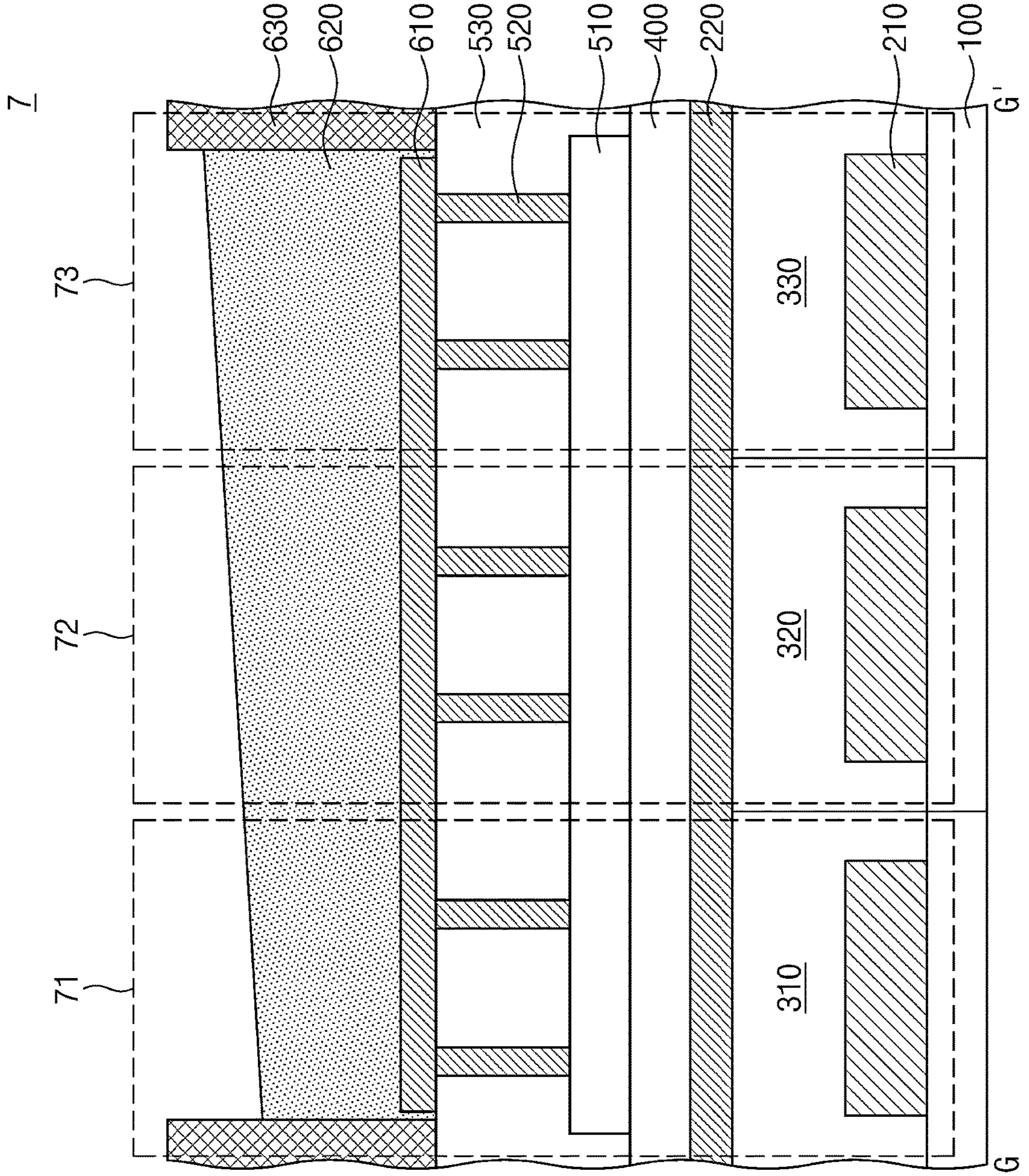
FIG. 21 is a cross-sectional view of line G-G' in FIG. 20.

FIG. 19 is a plan view of a display device according to some embodiments of the inventive concept. FIG. 20 is a plan view of a pixel in FIG. 19. FIG. 21 is a cross-sectional view of line G-G' in FIG. 20.

Referring to FIG. 19 to FIG. 21, a display device 7000 according to some embodiments of the present invention may be provided.

The display device 7000 may include a backplane 100, a partition wall 630, and a pixel 7 on the backplane 100. The pixel 7 is the same in other elements as the pixel 4 of FIG. 10 to FIG. 12, but unlike the pixel 4, only one transparent electrode 610 may be provided in the pixel 7. One or a plurality of vias 520 may be present between one transparent electrode 610 and one control unit 510, and the thickness of the shape control layer 620 may be controlled by applying different voltages to one transparent electrode 610.

Figure 22:
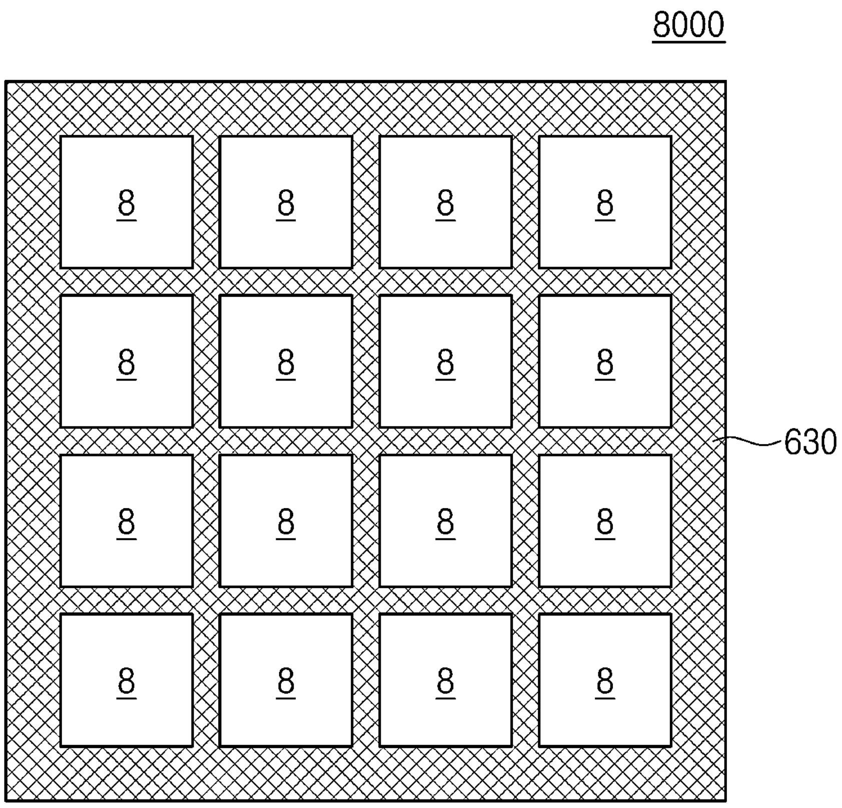
FIG. 22 is a plan view of a display device according to some embodiments of the inventive concept.
Figure 23:
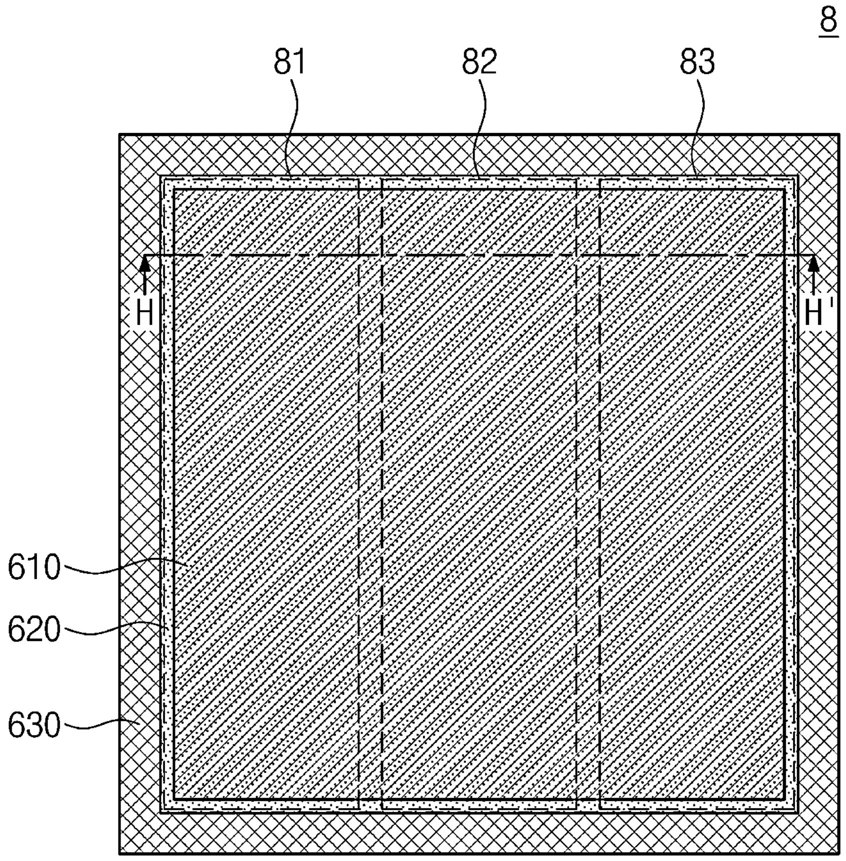
FIG. 23 is a plan view of a pixel in FIG. 22.
Figure 24:
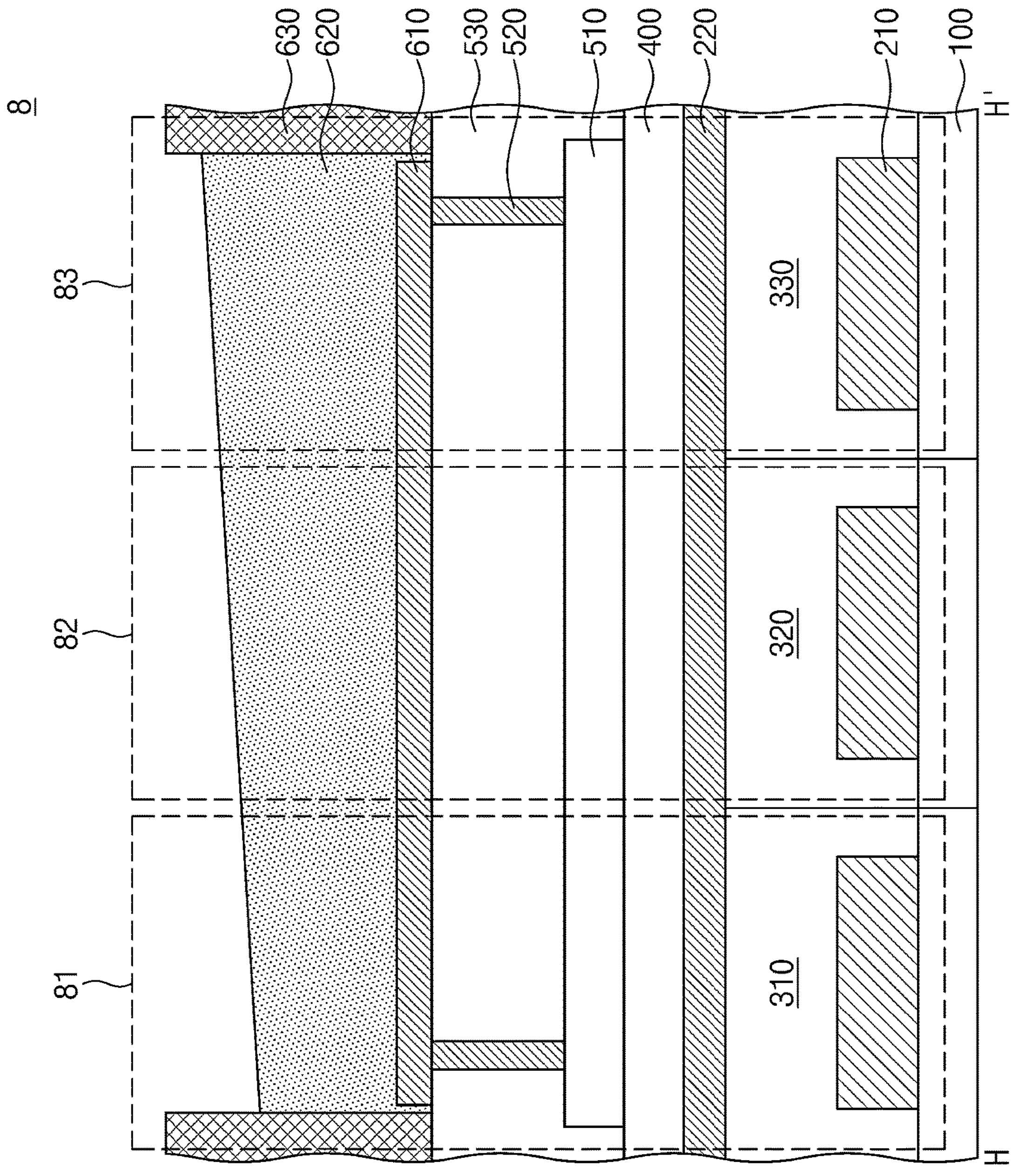
FIG. 24 is a cross-sectional view of line H-H' in FIG. 23.

FIG. 22 is a plan view of a display device according to some embodiments of the inventive concept. FIG. 23 is a plan view of a pixel in FIG. 22. FIG. 24 is a cross-sectional view of line H-H' in FIG. 23.

Referring to FIG. 22 to FIG. 24, a display device 8000 according to some embodiments of the present invention may be provided.

The display device 8000 may include a backplane 100, a partition wall 630, and a pixel 8 on the backplane 100. The pixel 8 is the same in other elements as the pixel 5 of FIG. 13 to FIG. 15, but unlike the pixel 5, only one transparent electrode 610 may be provided in the pixel 8. One or a plurality of vias 520 may be present between one transparent electrode 610 and one control unit 510, and the thickness of the shape control layer 620 may be controlled by applying different voltages to one transparent electrode 610.

A display device according to the present invention may exhibit high resolution, efficiency, and luminance in implementing a stereoscopic image through a light source having strong straightness and an electro-active polymer.

Embodiments of the present invention have been described with reference to the accompanying drawings. However, the present invention may be implemented in other detailed forms without changing the technical spirit or necessary features thereof. It is therefore to be understood that the above-described embodiments are illustrative in all aspects and not restrictive.

What is claimed is:

1. A display device comprising:
a backplane;
a plurality of control units disposed on the backplane;
a light source disposed between the backplane and the plurality of control units;
a plurality of transparent electrodes connected to the plurality of control units; and
a shape control layer disposed on the plurality of transparent electrodes,
wherein:
each of the plurality of control units is configured to control a voltage of a corresponding transparent electrode among the plurality of transparent electrodes; and
the shape control layer includes an electro-active polymer (EAP),
the shape control layer, the plurality of transparent electrodes and the light source are vertically overlapped, and
the plurality of transparent electrodes are interposed between the shape control layer and the light source.

2. The display device of claim 1, wherein the electro-active polymer comprises one or more selected from the group consisting of a conductive polymer, an ionic polymer, Nafion, and Flemion.

3. The display device of claim 2, wherein the conductive polymer comprises one or more selected from the group consisting of polypyrrole, polyaniline, polythiophene, and poly-sodium allyloxy hydroxypropyl sulfonate.

4. The display device of claim 2, wherein the ionic polymer comprises one or more selected from the group consisting of a carbon nanotube, a fluorinated polymer, and a sulfonated polymer.

5. The display device of claim 4, wherein the fluorinated polymer comprises a fluorinated acrylic copolymer.

6. The display device of claim 4, wherein the sulfonated polymer comprises one or more selected from the group consisting sulfonated polystyrene, sulfonated poly (vinyl alcohol), sulfonated poly(arylene ether sulfone), sulfonated ethylene vinyl alcohol copolymer, and sulfonated poly (styrene-b-ethylene-co-butylene-b-styrene).

7. The display device of claim 1, wherein the absolute value of the half beam angle of the light source is 5° or less.

8. The display device of claim 1, further comprising:
a first electrode on the substrate; and
a second electrode on the light source,
wherein the first electrode and the second electrode are spaced apart from each other with the light source interposed therebetween.

9. The display device of claim 8, wherein the first electrode comprises a transparent conductive material and an electrode material,
wherein:
the transparent conductive material includes one or more selected from the group consisting of a transition metal oxide, a metal nitride, indium tin oxide, and aluminum-doped zinc oxide; and
the electrode material includes one or more selected from the group consisting of silver (Ag), aluminum (Al), molybdenum (Mo), cobalt (Co), copper (Cu), gold (Au), platinum (Pt), tungsten (W), chromium (Cr), magnesium (Mg), and lithium (Li).

10. A display device comprising:
a backplane; and a plurality of pixels on the backplane,
wherein the pixels each include:
a control unit on the backplane;
a light source between the backplane and the control unit;
a transparent electrode connected to the control unit; and
a shape control layer on the transparent electrode,
wherein:
the control unit is configured to control a voltage of the transparent electrode; and
the shape control layer includes an electro-active polymer (EAP).

11. The display device of claim 10, wherein the pixels each comprise:
a first sub-pixel in which the light source is red light;
a second sub-pixel in which the light source is green light; and
a third sub-pixel in which the light source is blue light source.

12. The display device of claim 11, wherein shape control layers of the first sub-pixel, the second sub-pixel, and the third sub-pixel are spaced apart from each other.

13. The display device of claim 11, wherein the shape control layers of the first sub-pixel, the second sub-pixel, and the third sub-pixel are in contact with each other.

14. The display device of claim 10, wherein in each of the pixels, the transparent electrode is provided in plurality and spaced apart from each other.

15. The display device of claim 10, wherein in each of the pixels, the control unit is provided in plurality and spaced apart from each other.

16. The display device of claim 10, further comprising a partition wall on the backplane, wherein the shape control layer of each of the pixels are spaced apart from each other with the partition wall therebetween.

17. A display device comprising:
a backplane;
a partition wall on the backplane; and
a plurality of pixels on the backplane, wherein the pixels each include a first sub-pixel, a second sub-pixel, and a third sub-pixel, wherein the first sub-pixel, the second sub-pixel, and the third sub-pixel each includes:
a control unit on the backplane;
a transparent electrode connected to the control unit; and
a shape control layer on the transparent electrode,
wherein:
the first sub-pixel further includes a red light source between the backplane and the control unit;
the second sub-pixel further includes a green light source between the backplane and the control unit; and
the third sub-pixel further includes a blue light source between the backplane and the control unit,
wherein:
the control unit is configured to control a voltage of the transparent electrode; and
the shape control layer includes an electro-active polymer (EAP).

18. The display device of claim 17, wherein the shape control layers of the first, second, and third sub-pixels are spaced apart from each other with the partition wall therebetween.

19. The display device of claim 17, wherein the number of the transparent electrodes included in each of the first, second, and third sub-pixels are two or more.

20. The display device of claim 17, wherein the number of the control units included in each of the first, second, and third sub-pixels are two or more.

* * * * *